(12) United States Patent
Sorgie et al.

(10) Patent No.: US 9,384,459 B2
(45) Date of Patent: Jul. 5, 2016

(54) CERTIFIED FACTORY LOCATION

(71) Applicant: GT Nexus, Inc., Oakland, CA (US)

(72) Inventors: Thomas Sorgie, New York, NY (US); Kurt Eric Cavano, Ocean Grove, NJ (US)

(73) Assignee: GTNX, Inc., Oakland, CA (US)

( * ) Notice: Subject to any disclaimer, the term of this patent is extended or adjusted under 35 U.S.C. 154(b) by 84 days.

(21) Appl. No.: 14/291,116

(22) Filed: May 30, 2014

(65) Prior Publication Data

US 2014/0354408 A1 Dec. 4, 2014

Related U.S. Application Data

(60) Provisional application No. 61/830,279, filed on Jun. 3, 2013.

(51) Int. Cl.
*G06Q 10/08* (2012.01)
*G06K 17/00* (2006.01)

(52) U.S. Cl.
CPC .... *G06Q 10/0838* (2013.01); *G06K 2017/0045* (2013.01)

(58) Field of Classification Search
CPC ................... G06Q 10/0838; G06K 2017/0045
USPC ..................................... 340/8.1, 6.1
See application file for complete search history.

(56) References Cited

U.S. PATENT DOCUMENTS

| | | | |
|---|---|---|---|
| 6,996,543 B1 | 2/2006 | Coppersmith et al. | |
| 7,136,832 B2 * | 11/2006 | Li | G06Q 30/04 340/505 |
| 7,427,916 B2 * | 9/2008 | Matsumoto | G01D 9/005 340/3.1 |
| 2003/0023517 A1 * | 1/2003 | Marsh | G06F 17/30575 705/28 |
| 2003/0182259 A1 * | 9/2003 | Pickett | A01B 79/005 |
| 2005/0199723 A1 | 9/2005 | Lubow | |
| 2006/0180647 A1 | 8/2006 | Hansen | |
| 2007/0057050 A1 * | 3/2007 | Kuhno | G02B 27/62 235/383 |
| 2007/0199988 A1 | 8/2007 | Labgold et al. | |

(Continued)

FOREIGN PATENT DOCUMENTS

EP 2463815 A1 6/2012

OTHER PUBLICATIONS

EP Search Report mailed in Application No. 14170905.5 on Sep. 29, 2014.

(Continued)

*Primary Examiner* — Jennifer Mehmood
*Assistant Examiner* — Omar Casillashernandez
(74) *Attorney, Agent, or Firm* — Blank Rome LLP (57) ABSTRACT

A methods and systems are provided that relate to providing location data so that a retailer can know whether an item is produced at a factory it is purported to be produced at. A website may be provided to the retailer and/or exposed to the consumer. The consumer may be able to view information about the location of the factory, pictures of the factory, data about the factory (e.g., wage information, carbon footprint, size of the factory, inspection data, social compliance data, regulatory violations if any, etc.). A first geolocation may be received from a microchip associated with an item. A second geolocation may be obtained from a label associated with the item. The first geolocation and the second geolocation may be compared to determine whether the item was manufactured at the same place from or in which it is being packaged, shipped, and/or invoiced.

21 Claims, 5 Drawing Sheets

(56) References Cited

U.S. PATENT DOCUMENTS

| | | |
|---|---|---|
| 2007/0216531 A1 | 9/2007 | Lee |
| 2009/0187583 A1* | 7/2009 | Pape .................... G06Q 50/30 |
| 2010/0026570 A1 | 2/2010 | Amidi |
| 2011/0153614 A1 | 6/2011 | Solomon |
| 2011/0258130 A1 | 10/2011 | Grabiner et al. |

OTHER PUBLICATIONS

SG Search Report mailed in application No. 10201402869V on Dec. 15, 2014.

* cited by examiner

CERTIFIED FACTORY LOCATION

BACKGROUND

Consumers may be interested in obtaining information about the company responsible for having manufactured or the actual manufacturer of an item the consumer has purchased. Recently, several large companies have experienced public relations difficulties over conditions at the place of manufacture of items they sell. Such conditions have included low wages for factory workers, poor physical conditions at the factory, and/or an item's manufacture location. While some information about a particular supplier of a component or item may be available online, a process for validating that an item was actually produced at a location at which it is purported to be produced (e.g., by a brand, retailer, or manufacturer) is lacking. Moreover, consumers have a limited ability to ascertain information about the location where the item was manufactured.

BRIEF SUMMARY

According to an implementation of the disclosed subject matter, a first geolocation may be received from a microchip associated with an item. The first geolocation may correspond to a first location. A second geolocation may be obtained from a label. The second geolocation may correspond to a second location. The first location may be determined to be the same as the second location. The determination may be a validation that the item was manufactured at a location at which it was purported to be manufactured.

In an implementation, a first geolocation may be received from a microchip associated with an item. The first geolocation may correspond to a first location. A second geolocation may be obtained from a label. The second geolocation may correspond to a second location. The first location may be determined to not match the second location. The determination may be an indication that the item was not manufactured at a location at which it was purported to be manufactured. An alert or notice may be generated, stored, and/or transmitted to indicate that the manufacture location of the item is not validated.

A system is disclosed that includes a database for storing geolocation data and a processor connected to the database. The processor may be configured to upload and/or obtain geolocation data. It may receive a first geolocation from a microchip associated with an item. The first geolocation may correspond to a first location. The processor may be configured to obtain a second geolocation from a label that corresponds to a second location. The processor may compare the first geolocation with the second geolocation and determine that the first location and the second location match or differ. The determination may be deemed a validation or lack thereof. In some instances a notice or alert may be generated, stored, and or transmitted.

According to an implementation disclosed herein, one or more indications of geolocation may be received, directly or indirectly, from a microchip associated with an item. Each indication may correspond to a location. A second geolocation may be obtained from a label that corresponds to a second location. A request may be received based on a scan of the label by a consumer. The request may be for geolocation data associated with the item. The geolocation data may include the indications of geolocation (e.g., from the microchip) and the second geolocation from the label. A response to the request may be generated that includes a representation that the at least one indication of geolocation and the second geolocation are substantially similar. The response may be provided to an electronic device of the consumer.

A system is provided that includes a database and a processor communicatively coupled thereto. The database may store geolocation data for at least one manufacturer of an item. The processor may be configured to receive, from a microchip associated with the item, one or more indications of geolocation. Each indication of the one or more indications may correspond to a location. The processor may obtain a second geolocation from a label that corresponds to a second location. The processor may be configured to receive a request based on a scan of the label by a consumer. The request may be for geolocation data associated with the item. The geolocation data may refer to the one or more indications of geolocation and the second geolocation from the label. A response to the request may be generated that includes a representation that the one or more indications of geolocation and the second geolocation are substantially similar. The processor may provide the response to an electronic device of the consumer.

A benefit of the disclosed subject matter is that a consumer and/or retailer (e.g., brand) may obtain information regarding the manufacture of an item including a validation that the item was manufactured at the location it was purported to be manufactured. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations disclosed herein relate to providing location and other data so that a user (such as a retailer, a distributor, a consumer, etc.) can know that if an item is actually produced at a factory at which it is purported to be made. A website may be provided to the user (e.g., a consumer). In some instances access to the website may be configured and/or maintained by the retailer. The website may be accessible to a consumer when, for example, the consumer scans a label on the item. The scan may launch a web browser and load the website on the consumer's electronic device such as a smartphone. The consumer may be able to view information about the location of the one or more factories that made or were involved in the production of the item to which the label is attached. The consumer may view, for example, pictures of the factory, data about the factory (e.g., wage information, carbon footprint, size of the factory, inspection data, social compliance data, regulatory violations if any, etc.). The data about the may be provided as audited data and unaudited data. Audited data may refer to data that may be validated by a secondary authority (e.g., the retailer). Unaudited information may refer to user-provided commentary or data (e.g., pictures, videos, news articles). For example, a retailer may add data indicating social compliance of a factory with guidelines established by the retailer or the country in which the factory is located. The retailer may certify the wages of factory workers. A consumer may investigate and obtain data about the manufacture of the specific item the consumer has purchased and post at least some of that data to be associated with the product, retailer, distributor, manufacturer, etc. For example, the consumer may learn that Brand XYZ's bicycle is being sold at retailer ABC and provide an indication of such information for Brand XYZ's bicycle. The website for Brand XYZ's bicycle may contain a content submission form through which one or more users may submit media (e.g., video, audio, image, etc.) and text.

An item may refer to, for example, a good, a product, etc. that may be purchased and/or sold in commerce to a consumer. The manufacture of the item may be overseen and/or controlled by a retailer or brand. The retailer may contract with a manufacturer for actual production of the item. The manufacture of an item may involve one or more components that make up the item and/or one or more processes (e.g., steps) to create the item as it may exist in commerce. For example, an electronic device such as a smart phone may have a display screen that is manufactured at a first location and a processor manufactured at a second location. A chassis may be manufactured at a third location. The chassis manufacturer may receive the display and processor from the first and second locations and incorporate the display and processor as a component of the chassis manufacturing process or assemble the display and/or processor subsequent to the manufacture of the chassis (e.g., the chassis may be an item). As another example, a finished garment (e.g., the item) may be made from raw textile material (e.g., fabric) and buttons. The buttons and textile materials may be made at a first factory and a second factory. The garment may be made using the aforementioned components at a third factory. Some items may be entirely generated at one location or at multiple locations. For example, multiple steps may be involved in the construction of the garment. A finished garment may involve various steps of cutting, folding, pressing, and/or stitching the raw fabric or textile material that may be performed at one location or at several locations. Generally, the manufacture of an item is also associated with packaging the item (e.g., preparing it for shipment to a retailer or consumer), shipping the item, and/or invoicing the purchaser of the item (e.g., the retailer or consumer).

A retailer may contract with a manufacturer to create an item (e.g., smartphone or garment) at a first location. As disclosed herein, a microchip useful for associating a location with a component or an item of which the component is a part may be included (e.g., inserted, affixed to, etc.) in the component. A location associated with the microchip may be received and/or obtained. In some configurations, where the manufacture involves multiple steps, it may be desirable to obtain a location at each step of the process. The location data may be associated with a time reference each time it is obtained and/or received. Additional data may also be associated with the location data (e.g., the step in the process to be associated with the location data, name of individual overseeing the step in the process, etc.). The additional data may be automatically entered or user entered. For example, the cutting of fabric to make a garment may be performed by a mechanical device. The device may obtain, enter, and/or receive the location data from the microchip and store, upload, enter, etc. that the location data at the time of the cutting process corresponds to that process. After the item is manufactured, it may be packaged. A label may be affixed, printed, obtained, etc. and associated with the package. The label may correspond to a second location. The label location data may be compared to the microchip location data to validate that the item was made and packaged at the same factory or location. In some configurations, the label may be associated with the item at a time prior to packaging the item or subsequent to packaging the item (e.g., during invoicing). A retailer may access the location data obtained from the microchip and/or the label to verify the manufacture of the item. In some configurations, the retailer may expose the data and/or allow access to the data by a consumer of the item.

Figure 3:
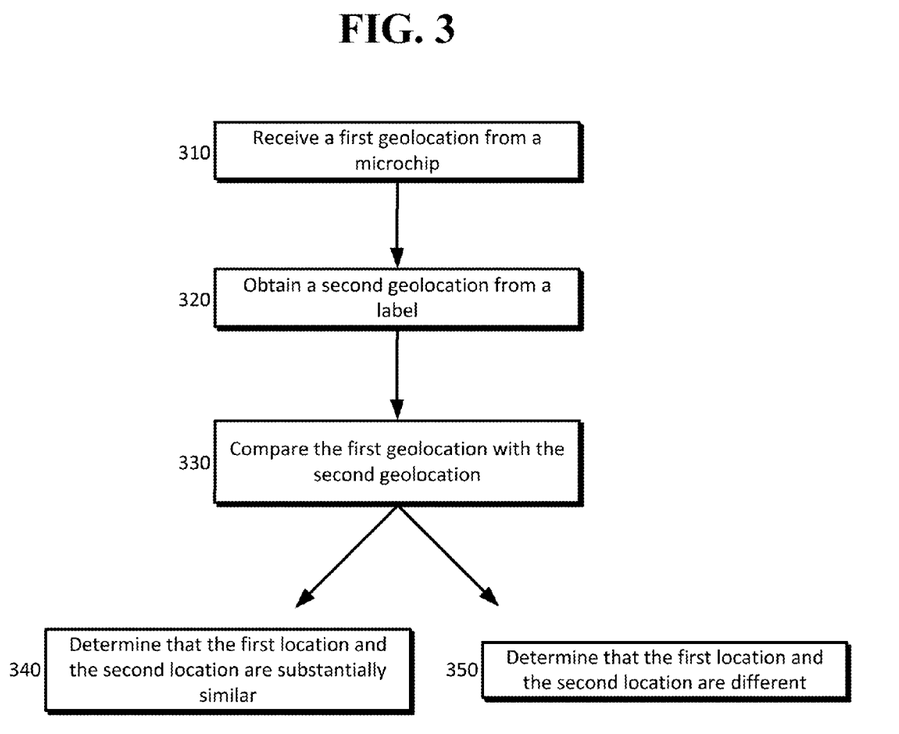
FIG. 3 is an example process for comparing a first location to a second location to determine if there is a match as disclosed herein.

In an implementation, a first geolocation may be determined or received based upon a signal received from or by a microchip at 310. The microchip may be associated with an item. For example, an electronic record may be stored to a computer readable medium. The record may include an identifier of the microchip and an identifier of the item. The first geolocation may correspond to a first location. The microchip may include a processor, a communications module, a storage module and/or a GPS sending/receiving module. The communications module may be utilized to transmit geolocation data or receive data from an external source. The GPS sending/receiving module maybe utilized to obtain GPS coordinates of the microchip. For example, it may receive satellite location data, signal time of flight data, etc. The GPS sending receiving module may transmit a request for satellite position data in some instances. In some configurations, the GPS sending/receiving module may be utilized to obtain or receive a geo-fence. The geo-fence may indicate the boundaries of the factories or it may represent a predefined area around and including the microchip. For example, the first geolocation may refer to a set of coordinates that indicate a boundary region of the first location. The storage module may be utilized to store location data obtained from the GPS sending/receiving module. For example, the microchip may receive coordinates of the factory or manufacturer. As long as the microchip resides within the boundary of the factory, it may indicate as much, for example, by storing or indicating "true" in response to the location (that may be defined by a geo-fence. In some instances, the first geolocation may not be identical to the first location. For example, the geolocation may be represented as a set of coordinates that identify a specific point and the first location may correspond to the boundary of a factory or manufacturer within which the specific point is located.

The microchip may be inserted into the item or a component that is used to generate or construct the item. For example, a scanner or printer may be utilized to insert the microchip into the item. In some instances, the microchip may be associated with the item. For example, the microchip may be a component of a USB port/receiver that is attached or affixed to the item. In some configurations, the first geolocation may be based on the location of the scanner. The microchip may be programmed with the first geolocation in some configurations. For example, the microchip may be programmed and/or obtained with the geo-fence describing or identifying the boundary of the factory.

A second geolocation may be obtained from a label at 320. The second geolocation may correspond to a second location. As above, the second geolocation may not be identical to the first location. The label may be printed by a conventional or special purpose printer. It may be, for example, a serial number, a bar code, a RFID or a QR code. The information encoded by the label may include geolocation data of the item at the time the label is affixed to it.

The first geolocation and the second geolocation may be compared to one another at 330. In some instances, it may be determined that the first location and the second location are the same based on the first geolocation and the second geolocation at 340 or different at 350. For example, the geolocation data from the microchip may be obtained by scanning the microchip, receiving data transmitted directly or indirectly by or from the microchip. The comparison may be performed on any device that can store and/or access the geolocation data. For example, the geolocation data may be uploaded to a remote server and, upon receiving a scan of the label, the server may perform the comparison. As another example, a handheld device may be utilized to scan or print the label. The handheld device's action (e.g., scanning or printing the label) may be utilized as an indication to perform the comparison. The handheld device may retrieve the geolocation data and perform the comparison data on the fly. In some instances the handheld device may communicate with a server on which the geolocation data are stored. The server may return the result of the comparison to the handheld device.

In some configurations, a notice may be generated that indicates the first location and the second location are substantially the same or identical. The notice may be stored to a computer readable medium that is accessible by the consumer. For example, the consumer or retailer may access a website that displays an indication of the comparison (e.g., a notice).

The first geolocation and the second geolocation being the same or substantially similar may be an indication that a product was produced by the same factory or in the same location. For example, Factory ABC may produce electronic displays for smartphones. The company may receive several components and/or raw materials for the display including a mounting bracket. The mounting bracket may be stamped with the microchip. As the display is constructed, the microchip may generate records for the location of the mounting bracket. At the end of the process for generating the smartphone display, a label may be placed on the package in which the display is placed or on the surface of the display itself. The label may contain a serial number or bar code, for example, that indicates GPS and/or date/time information. In the event the location provided by the label and that of the microchip are substantially similar or the same, it indicates that the item was manufactured and packaged at the same location. A location may be substantially similar if, for example, a manufacturing process requires that the item is moved to a different building, thereby changing a GPS coordinate. Thus, a location may be substantially similar if the location is functionally the same but differ due to a local arrangement of manufacturing. The mounting bracket, for example, may be derived from a mold in a first building and moved to a second building to be combined with a LCD. In some configurations, the label may be a stamp that validates that the microchip location data indicate the item was manufactured in essentially the same location. For example, manufacturing the electronic display may require the mounting bracket to be constructed first, and then several layers that form the LCD are added in succession and combined with the bracket. During each of the steps in the manufacture of the display, location data from the microchip associated with the mounting bracket may be received. The microchip, for example, may record location data at a predetermined interval of once every twenty minutes. The location data may be stored to a database and, the label may be stamped or affixed to the finished item only if the location data from the microchip corresponds to a single location (or substantially similar location as described above). A consumer may subsequently scan the label and be presented with information about the factory, the item, and/or the location data as recorded by the microchip. Similarly, in the event the item contains multiple components, each of which individually contained a microchip, the label may provide a validation of each of the components' manufacture and/or a link to information about each of the individual components of the item.

Figure 4:
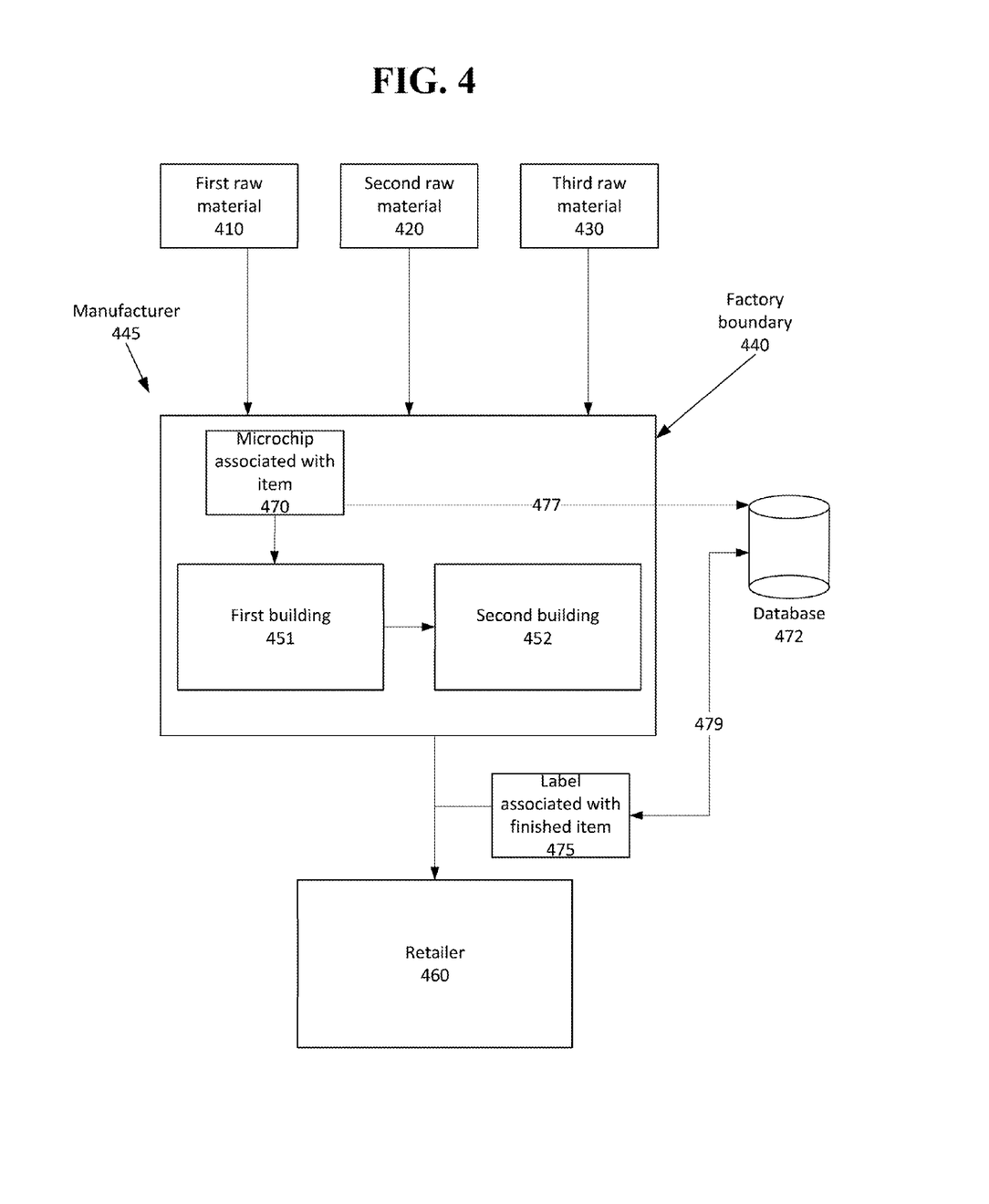
FIG. 4 is an example overview of the use of the microchip and label to provide a consumer and/or retailer information about the manufacture of an item as disclosed herein.

In the example shown in FIG. 4, a first 410, second 420, and third 430 raw material is provided to a manufacturing building or factory 445. The raw materials may themselves contain a microchip and/or label. For example, in a smartphone assembly plant, the raw materials may represent a processor and motherboard, a cellular antenna, and a display. Each of these components may have been separately manufactured.

The factory 445 may contain one or more buildings and may be associated with a geofence or other boundary 440 that demarcates a first building 451 and a second building 452 as belonging to the single manufacturer 445. As stated above, the factory may have more than one location associated with it. In some instances, the proximity of the building may be in close proximity to one another. But in some instances the buildings belonging to the factory may be physically separated and intervening structures (e.g., environment, other industrial, commercial, or residential buildings, etc.) may exist between the separate buildings. Nonetheless, the buildings may be associated with the same factory. A microchip may be associated with the item at the location of the factory 470 during at an early or initial phase of manufacture or assembly of the item. The microchip may be activated upon association with the item. Activation of the microchip may be performed by an electronic signal that is received by the microchip. In some instances, the microchip may require a battery to be inserted into it to provide power for the GPS sensor that it contains. Moreover, the microchip may contain other hardware and circuitry suitable for it to be able to communicate data (e.g., GPS and time data) 477 to a database 472. The microchip, for example, may report data as shown below in Table 1:

TABLE 1

Example data that may be sent/stored by the microchip and/or derived therefrom.

| Time | GPS Coordinates | Entity | Building |
|---|---|---|---|
| 07-04-2014-5:00 AM GMT | 38.894967, −77.034917 | ABC | First building |
| 07-04-2014-5:30 AM GMT | 38.894967, −77.034917 | ABC | First building |
| 07-04-2014-8:00 AM GMT | 38.894967, −77.034917 | ABC | First building |

TABLE 1-continued

Example data that may be sent/stored by
the microchip and/or derived therefrom.

| Time | GPS Coordinates | Entity | Building |
|---|---|---|---|
| 07-04-2014-8:10 AM GMT | 38.898000, −77.036517 | ABC | Second building |
| 07-04-2014-6:00 PM GMT | 38.898000, −77.036517 | ABC | Second building |
| 07-04-2014-6:03 PM GMT | 38.898000, −77.036517 | ABC | Second building |
| 07-04-2014-9:00 PM GMT | 38.898000, −77.036517 | ABC | Second building |
| 07-11-2014-1:46 PM GMT | 37.795050, −122.402729 | XYZ | Retailer |

The data provided by the microchip may be stored to computer readable memory such as FLASH or NAND rom that is part of the microchip. The stored data may be later retrieved at the end of the manufacturing process and uploaded to a database 472 at that time. In some configurations, the microchip may transmit the data to a database 472 directly or indirectly. The data transmitted by the microchip may be sent in a more compact form. For example, the data sent by the microchip for the first building may be: 07-04-2014-5:00AMGMT*38.894967*-77.034917 where each asterisk separates values. The database 472 may associate the entity and building that corresponds to the GPS data provided by the microchip. In the example shown in FIG. 4 and the example data provided in Table 1, the locations of the first building 451 and the second building 452 are distinct, but substantially similar. Thus, both the first building 451 and the second building 452 are identified as belonging to the entity of the manufacturing company, ABC.

In some configurations, the microchip may continue to report geolocation data depending on its power source. In Table 1, the last entry is for the Retailer, XYZ. This entry or record may be generated, for example, when the label is scanned if the label is generated and/or affixed by the retailer. According to an implementation, if the label is scanned by an electronic device capable of independently providing geolocation data, it may be determined that the geolocation data obtained from the electronic device corresponds to that of a retailer. For example, the database storing the geolocation data may contain a list of coordinates for one or more retailers and/or manufacturers. As the database is populated with geolocation data, it may compare the geolocation coordinates that it receives from the microchip or obtains from the label to those associated with a retailer and/or manufacturer to identify, for example, the first building of manufacturer and/or the manufacturer itself. If the label is affixed at the end of the manufacturing of the item by the manufacturer, the geolocation data embedded in the label (e.g., based on the bar code on the label) may correspond to the manufacturer. If a consumer scans the item at the retailer with an electronic device capable of providing geolocation data, the system may compare the geolocation data it receives from the electronic device. That is, both the geolocation data obtained from the label itself and the geolocation data based on, for example, the GPS sensor of the consumer's electronic device may be sent to the database. The system may determine that the electronic device's geolocation data matches a known retailer contained in the database. A database entry, such as the one provided in Table 1 for retailer XYZ may be generated and stored.

In the event the GPS coordinates obtained from the consumer's electronic device do not match a known retailer and/or manufacturer in the database, the system may generate and store an entry as described above, however it may leave blank, for example, the Entity name as shown in Table 1. As another example, the system may not allow new entries to be generated once an indication has been received that the manufacturer has finished production of the item, shipped the item, and/or that the item has been received by a retailer. For example, once the manufacturer affixes the label and scans it, the system may make the label's geolocation data the last entry by virtue of the geolocation being derived from the label scan (e.g., indicating that manufacturing of the item has been completed). Similarly, when a retailer receives inventory, it may scan the label affixed to the item and a database entry may be generated and stored as described above. Once the system matches geolocation data to a retailer, it may cease generating and/or storing geolocation data for the item. In some instances, every time the label is scanned, a data entry may be generated and stored by the database. Thus, a consumer may be presented with a representation of the geolocation data from the microchip, the label, and/or any subsequent scans of the label by a consumer's electronic device. The data may be organized and presented to the consumer as in Table 1 and may contain hyperlinks to further information about the manufacturer.

Subsequent to the manufacture of the item, a label may be affixed or associated with the item 475 by the manufacturer 445 or the retailer 460. The label may be placed on the item or packaging of the item. It may be exposed to the outside environment so that a consumer may easily scan the label to obtain the desired manufacturing information. As described above, scanning the label, for example with a smartphone, may access a database 472 to which the microchip data are stored 479. Various implementations may store the microchip data on a first database and store the same or modified version thereof on a second database that is distinct from the first database. A user who scans the label may be presented with the data shown in Table 1 as well as additional information about the manufacturer 445 and retailer 460 as described earlier.

In some implementations, a first time reference may be received at substantially the same time as or contemporaneously with the first geolocation. Similarly, a second time reference may be received at substantially the same time as or contemporaneously with the second geolocation. The time reference data may be utilized as a component of the geolocation abilities described earlier. The time reference data may be stored to a server and/or be provided to a retailer and/or consumer. The time reference data may be accompanied by a certification from a worker who performed a particular step in the manufacture of the item.

As stated earlier, an item may be made up of one or more components. Each of the components may itself have a unique microchip that is programmed with, has received, or has obtained at least one geolocation. The retailer may be able to access all of the geolocation data for each the individual components that make up the item via a website, for example. Each component may have had a label affixed to or associated with it after it was made and each individual component may have been individually validated for its authenticity of manufacture (e.g., that it was made at the location it purports to be made at). The finished item made up of the individual components may have a label affixed or associated with it at or near the time of packaging, shipping, and/or invoicing. The validation for the item may refer to only the steps performed at one particular manufacturing plant, factory or the like. The validation for the item may also refer to the former as well as the validations for each of the individual components. Likewise, all of the validation or a portion thereof may be exposed to a consumer.

Likewise, the manufacture or production of an item may include one or more steps. Geolocation data for each individual step may be obtained and compared against other geolocation data performed at the same factory, manufacturer, etc. to determine the authenticity of manufacture for each step of the item's manufacture. As stated earlier, additional data (e.g., a worker certification for a step, a machine automated entry, etc.) may be associated with the geolocation data at each step of the manufacturing process. The data may be exposed to a consumer, for example, via a website as described above. In some instances, it may be desirable to associate a picture, video, or audio data with the item. Such data may also be associated with a geolocation and/or a time reference.

An implementation can obtain or receive geolocation data from one or more components and/or one or more steps to manufacture an item. A pairwise comparison may be performed between the geolocation data obtained or received from one or more components and/or one or more steps and the geolocation obtained from the label. Other data disclosed herein collected, received, and/or obtained may also be compared and/or analyzed as above.

A website may be utilized to provide an interface with which a retailer and/or consumer may view the validation data obtained from the geolocation information, time reference data, or additional data as described above. The retailer may enter additional data such as employment data (e.g., factory size, workforce size, worker wage data etc.), social and/or regulatory compliance data (e.g., environmental violations if any, labor law compliance, carbon footprint, etc.). A consumer may access the website, for example, by entering a URL into a web browser or by scanning the label. The data may be associated with an item. For example, a retailer may manufacture an item at four different factories. Data specific to the factory from which the item is deemed to originate may be associated the item. Thus, an item manufactured at factory A may have data regarding factory A associated with it, but not data for a different factory.

In an implementation, a first geolocation may be received based on a signal received from a microchip associated with an item. The first geolocation may correspond to a first location. A second geolocation may be obtained from a label. The second geolocation may correspond to a second location. The first geolocation and the second geolocation may be compared. It may be determined that the first location and the second location are different. In some configurations a notice may be provided to the manufacturer, the retailer, and/or the consumer to indicate that the item may not have actually been manufactured at the location at which it is purports to have been manufactured.

In an implementation, a microchip can be associated with a manufactured item and/or a component of the item (an "object"). The microchip can be associated with the item or component by inserting it, affixing it (e.g., with glue), incorporating it as a part of a 3D printing fabrication, or in any other way to associate the microchip. In an implementation, the chip is associated with the object in a tamper-resistant way. That is, if an unauthorized attempt is made to alter the microchip, the microchip can render itself non-functional or change its behavior to indicate that it may not be reliable.

In an implementation, the microchip contains a code that can indicate a particular one or more of a geographic location, a specific manufacturing facility, a specific manufacturer, the identity of a worker, a time reference indicating the date and/or time at which the microchip was activated or associated with the object and any other information that would be useful in establishing the provenance of the object and the compliance of the manufacturer or assembler with relevant rules, regulations and laws ("manufacturing data.")

The data encoded in the microchip can be cryptographically protected. For example, the data can be encrypted using a symmetric or asymmetric key using any suitable cryptographic protocol known in the art.

A label can be associated with an object, such as on the object or on packaging of the object. The label can include one or more elements of manufacturing data, such as the purported location(s) of manufacture and/or assembly. The one or more microchips can be read for some or all of the data they contain. The label manufacturing data can be compared to the label manufacturing data. An implementation can indicate if there is a match between the label and microchip manufacturing data. An implementation can indicate any and all differences between the label and microchip manufacturing data. An implementation can automatically send a message to a regulatory or other authority if a difference is detected. The message can include elements such as a product name, a product retailer, a product manufacturer, a product serial number, etc. and indications of the discrepancies between the label data and the microchip data.

Figure 5:
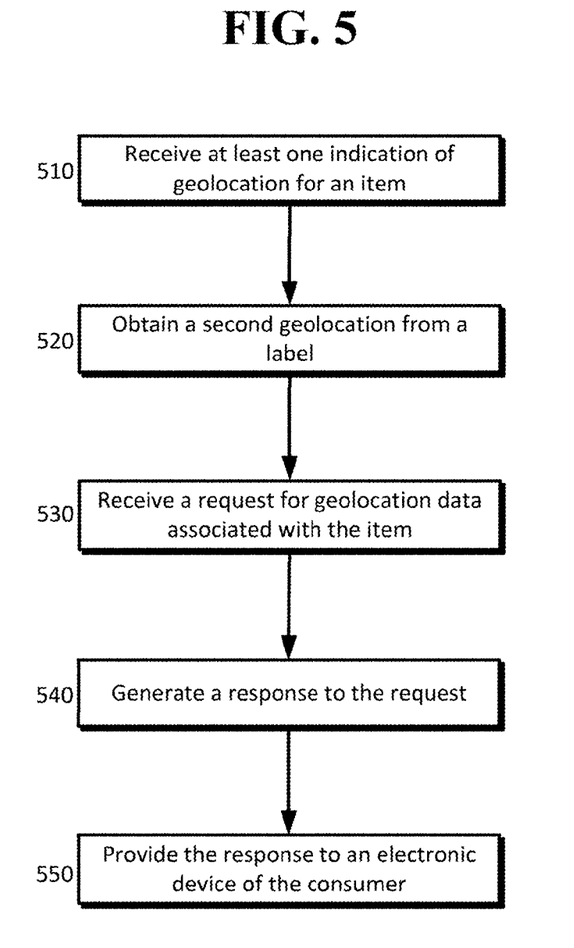
FIG. 5 is an example process for generating a response to a request for geolocation data corresponding to an item as disclosed herein.

According to an implementation disclosed herein, an example of which is provided in FIG. 5, one or more indications of geolocation may be received, directly or indirectly, from a microchip associated with an item at 510. Each indication may correspond to a location. For example, each row of the data shown in Table 1 corresponding to the first building and the second building may be an indication of geolocation. The microchip may store geolocation data locally as described earlier and/or the microchip data may be wirelessly communicated to a local or remote server/database. The data obtained from the microchip may include an identifier corresponding to the factory, the item, etc. Thus, the microchip data may be associated with a specific item. In some configurations, the manufacturer for the item may be determined based on the geolocation data received.

A second geolocation may be obtained from a label that corresponds to a second location at 520. For example, at the end of the manufacturing process for an item, a label may be automatically generated by a printer and affixed to the manufactured item. The label may include a unique code corresponding to the manufacturer and a second location. The manufacturer may scan the label and/or generate an entry of one or more of the time, date, and geolocation based on the label data. The entry data may be stored to a database (e.g., the same database as the one or more indications of geolocation received from the microchip). The item may subsequently ship to a retailer for the item as described above. A request may be received based on a scan of the label by a consumer at 530. For example, the consumer may scan a QR code or a bar code on the label. The request may be received as a query for geolocation data associated with the specific item on which the label is printed. Thus, the label may be unique for each item. The label may contain a unique identifier such as a product identification, a serial number, etc. for each item. The geolocation data may include the indications of geolocation (e.g., from the microchip) and the second geolocation from the label. A response to the request may be generated at 540 that includes a representation that the at least one indication of geolocation and the second geolocation are substantially similar. For example, in some configurations, a consumer may be exposed to raw geolocation data that includes the GPS data. In some configurations, the consumer may be presented with a simple interface that shows the item's identity (e.g., a smartphone name) and an indication that the manufacturing has been validated. The manufacturing being validated may refer to the microchip geolocation data matching the label geolocation data, thereby indicating that the item remained in the same or substantially similar location throughout its manufacture. The response may be provided to an electronic device of the consumer (e.g., a computer, a smartphone, a tablet) at 550.

Figure 6:
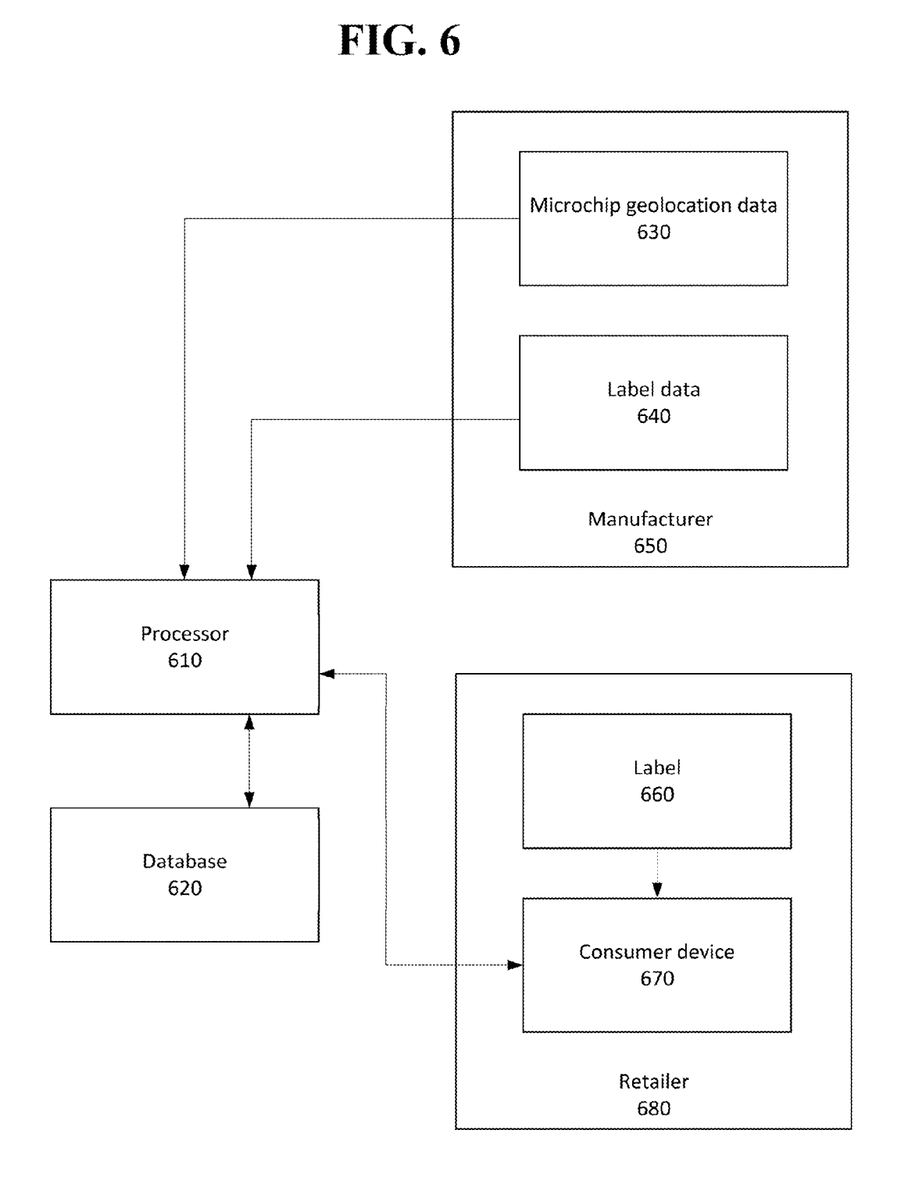
FIG. 6 is an example system for generating a response to a request for geolocation data corresponding to an item as disclosed herein.

A system, as shown in the example in FIG. 6, is provided that includes a database 620 and a processor 610 communicatively coupled thereto. The database 620 may store geolocation data 630 for at least one manufacturer of an item 650. The processor 610 may be configured to receive, from a microchip associated with the item, one or more indications of geolocation. For example, the microchip may report, at predetermined intervals, geolocation data (see, e.g., Table 1). Each indication of the one or more indications may correspond to a location. The processor 610 may obtain a second geolocation 640 from a label that corresponds to a second location. The processor 610 may be configured to receive a request based on a scan of the label 660 by an electronic device of a consumer 670, for example, while the consumer is browsing items at a retailer 680. The request may be for geolocation data 630, 640 associated with the item. The geolocation data 630, 640 may refer to the one or more indications of geolocation 630 and the second geolocation 640 from the label. A response to the request may be generated that includes a representation that the one or more indications of geolocation 630 and the second geolocation 640 are substantially similar. The processor 610 may provide the response to an electronic device of the consumer 670.

Figure 1:
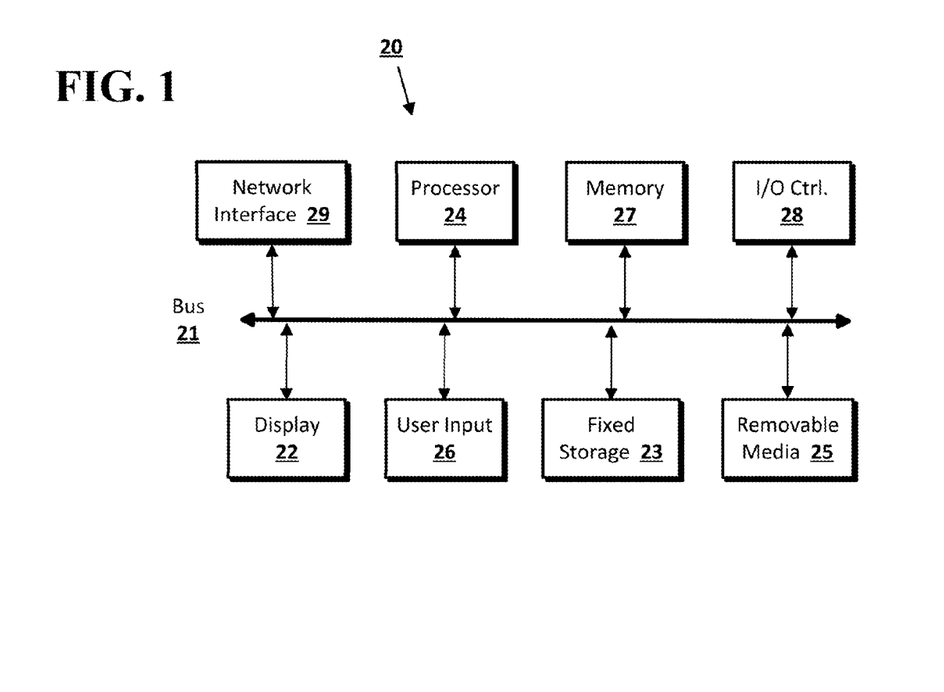
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
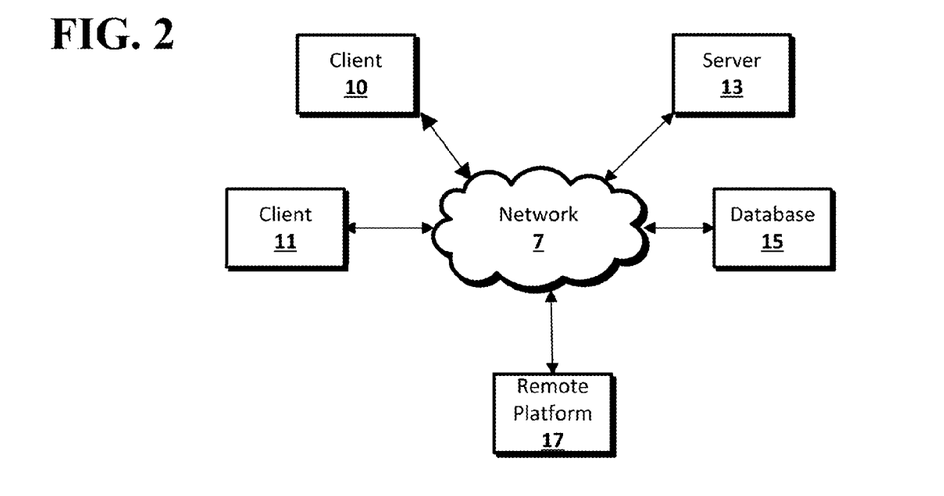
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
   receiving, from a microchip associated with an item, at least one indication of geolocation, wherein the at least one indication of geolocation comprises a set of location coordinates;
   obtaining a second geolocation from a label wherein the second geolocation corresponds to a location of the label and comprises a set of location coordinates;
      wherein a pre-defined boundary region is defined by one or more sets of location coordinates, and any geolocation within the pre-defined boundary region is associated with a named location;
   receiving a request based on a scan of the label by a consumer, wherein the request includes geolocation data associated with the item, and wherein the geolocation data comprises the at least one indication of geolocation and the second geolocation from the label;
   generating a response to the request, wherein the response comprises a representation that the at least one indication of geolocation and the second geolocation are of the same named location;
   providing the response to an electronic device of the consumer, the response verifying or not verifying the representation; and
   if the response does not verify the representation, sending a message to an authority or other third party indicating a discrepancy concerning a lack of representation verification.

2. The method of claim 1, further comprising inserting, into the item, the microchip that communicates the at least one indication of geolocation.

3. The method of claim 2, wherein the step of inserting the microchip is performed by a scanner or a printer.

4. The method of claim 1, further comprising receiving a time reference contemporaneously with each of the at least one indication of geolocation and with the second geolocation.

5. The method of claim 4, wherein each time reference is accompanied by a certification from a worker responsible for activity occurring at the respective time reference.

6. The method of claim 1, wherein the item comprises one or more components, each of the one or more components is associated with a unique microchip, each microchip provides an indication of geolocation comprising a set of location coordinates, and the response comprises a representation that every indication of geolocation and the second geolocation are of the same named location.

7. The method of claim 1, wherein a manufacture of the item comprises one or more steps, the method further comprising obtaining at least one of a third geolocation and a third time reference from the microchip at each of the one or more steps.

8. The method of claim 7, further comprising: comparing the third geolocation to the second geolocation; and determining that the third geolocation and the second geolocation are of the same named location.

9. The method of claim 7, wherein each third time reference is accompanied by a certification from a worker responsible for the respective step.

10. The method of claim 1, further comprising receiving one or more image captures from a camera associated with the microchip.

11. The method of claim 1, wherein the named location is associated with a manufacturer, and the response further provides a representation that the at least one indication of geolocation and the second geolocation are of the same manufacturer.

12. The method of claim 11, wherein the response further comprises data specific to the manufacturer, and wherein the data includes image data of the item at each of the at least one geolocation, image data at the second geolocation, and social compliance data of the manufacturer.

13. The method of claim 12, wherein the response further comprises employment data of a worker responsible for activity occurring at each of the at least one geolocation and the second geolocation.

14. A system, comprising:
   a database for storing geolocation data for at least one manufacturer of an item;
   a processor connected to the database, configured to:
      receive, from a microchip associated with the item, at least one indication of geolocation, wherein the at least one indication of geolocation comprises a set of location coordinates;
   obtain a second geolocation from a label wherein the second geolocation corresponds to a location of the label and comprises a set of location coordinates;
      wherein a pre-defined boundary region is defined by one or more sets of location coordinates, and any geolocation within the pre-defined boundary region is associated with a named location;
   receive a request based on a scan of the label by a consumer, wherein the request includes geolocation data associated with the item, and wherein the geolocation data comprises the at least one indication of geolocation and the second geolocation from the label;
   generate a response to the request, wherein the response comprises a representation that the at least one indication of geolocation and the second geolocation are of the same named location;
   provide the response to an electronic device of the consumer, the response verifying or not verifying the representation; and
   if the response does not verify the representation, send a message to an authority or other third party indicating a discrepancy concerning a lack of representation verification.

15. The system of claim 14, wherein the processor is further configured to:
- receive a time reference contemporaneously with each of the at least one indication of geolocation and with the second geolocation, where each time reference is accompanied by a certification from a worker responsible for activity occurring at the respective time reference.

16. The system of claim 14, wherein a manufacture of the item comprises one or more steps, and wherein the processor is further configured to:
- obtain at least one of a third geolocation and a third time reference from the microchip at each of the one or more steps, where each third time reference is accompanied by a certification from a worker responsible for the respective step;
- compare the third geolocation to the second geolocation; and
- determine that the third geolocation and the second geolocation are of the same named location.

17. The system of claim 14, wherein the named location is associated with a manufacturer, and the response further provides:
- a representation that the at least one indication of geolocation and the second geolocation are of the same manufacturer; and
- data specific to the manufacturer, the data including image data of the item at each of the at least one geolocation, image data at the second geolocation, social compliance data of the manufacturer, and employment data of a worker responsible for activity occurring at each of the at least one geolocation and the second geolocation.

18. A computer-implemented method for validating location of product manufacture, the method comprising the steps of:
- receiving, from a microchip associated with a first item, an indication of time and location of the first item at each of: first item arrival at a new location; transformation of the first item, a beginning and end of transportation of the first item, a beginning and end of storage of the first item, and combination of the first item with a second item;
- receiving, from a microchip associated with the second item, an indication of time and location of the second item at each of: second item arrival at a new location; transformation of the second item, a beginning and end of transportation of the second item, a beginning and end of storage of the second item, and combination of the second item with the first item;
- receiving, from a label associated with a product, an indication of time and location of the product upon association of the label to the product, where the product is comprised of the first and the second items;
- receiving, from the label associated with the product, an indication of time and location of the product at each of: product arrival at a new location; transformation of the product, a beginning and end of transportation of the product, and a beginning and end of storage of the product;
    - wherein location indications include predefined boundaries, where the predefined boundaries include one or more facilities defined as being within a single named location, and where the location indications include all of an actual location, an associated named location, and a named manufacturer associated with the associated named location;
- receiving a request, based on a scan of the label, to assess certain, pre-defined indications of location of the first and the second items relative to certain, pre-defined indications of location of the product; and
- generating a response to the request, wherein the response comprises a representation that the certain, pre-defined indications of location of the first and the second items are the same as the certain, pre-defined indications of location of the product.

19. The method of claim 18, wherein the certain, pre-defined indications of location of the first item, of the second item, and of the product all have the same associated named location and the response therefore validates location of product manufacture.

20. The method of claim 18, wherein each indication of time and location for each of the first and the second items further includes an identification of individual overseeing each indication.

21. The method of claim 20, wherein the certain, pre-defined indications of location of the first item, of the second item, and of the product all have the same associated named location, and the response therefore validates location of product manufacture and further provides the identification of the individuals overseeing each indication.

* * * * *